C. G. BUSH.
Objects for Kaleidoscopes.
No. 143,271. Patented September 30, 1873.
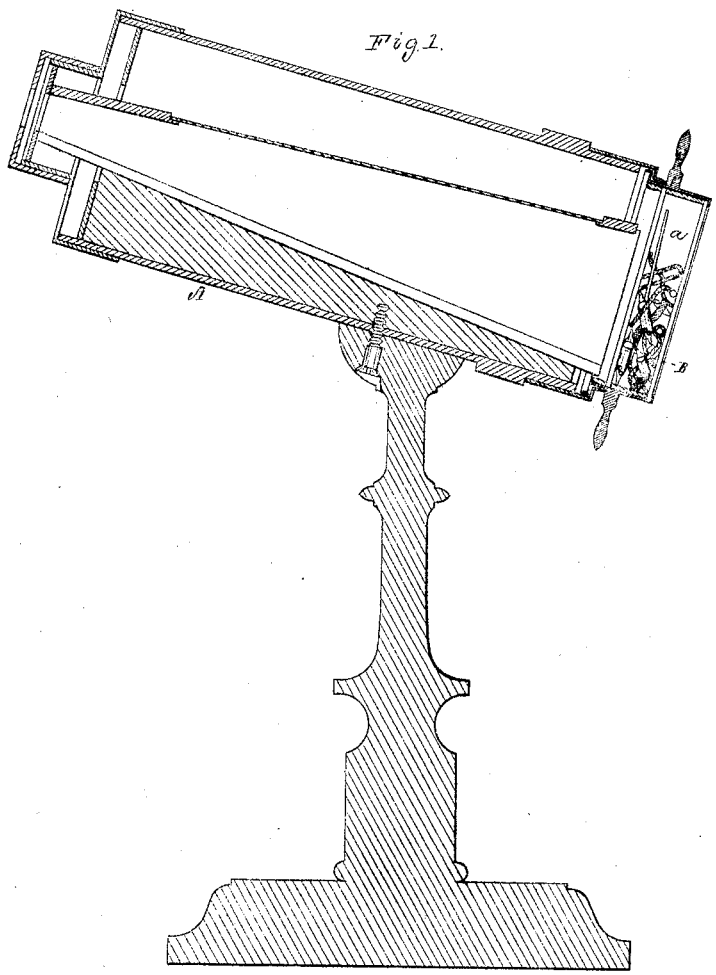
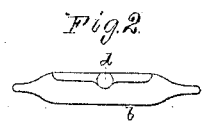
Witnesses.
S. N. Piper
L. N. Möller
Charles G. Bush,
by his attorney

UNITED STATES PATENT OFFICE.

CHARLES G. BUSH, OF BOSTON, MASSACHUSETTS, ASSIGNOR TO HIMSELF AND J. W. HOARD, OF PROVIDENCE, RHODE ISLAND.

IMPROVEMENT IN OBJECTS FOR KALEIDOSCOPES.

Specification forming part of Letters Patent No. 143,271, dated September 30, 1873; application filed November 30, 1872.

*To all whom it may concern:*

Be it known that I, CHARLES G. BUSH, of Boston, of the county of Suffolk and State of Massachusetts, have invented a new and useful or Improved Kaleidoscope; and do hereby declare the same to be fully described in the following specification and represented in the accompanying drawings, of which—

Figure 1 is a vertical and longitudinal section of a kaleidoscope as invented by me. Fig. 2 is a side view, and Fig. 3 a longitudinal section, of one of its compound objects, or hermetically-sealed glass tube containing two or more immiscible liquids or other matters of similar character.

Heretofore, in the manufacture of kaleidoscopes, some of the objects used in the rotary object chamber or box in front of the reflectors have been solid bodies of various colors or forms, and such may be used with my invention.

In carrying out my said invention I combine with the kaleidoscope A, as usually made, with or without its solid objects in the object box or chamber $a$, by placing in such chamber one or more glass vessels or tubes, B, hermetically sealed, and containing two liquids of different densities, which will not intermix or combine, the purpose being to produce one or more new and useful effects—viz., the movement or movements through the action of gravity of the air, liquid, or solid in the main liquid independently of the movements of the hermetically-sealed vessel or tube; also, to obtain better or more brilliant colors than can usually be obtained by coloring solids, the vessels holding chemically-colored solutions. The compound object is to fall, or be caused by gravity to fall, into different positions while the object-box may be in rotation.

A hollow glass object with its two immiscible liquids is shown in Figs. 2 and 3, in which $b$ is the vessel hermetically sealed, and $c$ and $d$ the two immiscible liquids, the whole being like an ordinary minute glass spirit-level.

Although I have shown a glass object provided with a single liquid and a bubble of air, I would remark that such is an object ordinarily used, and in carrying out my invention I substitute for the air-bubble another liquid of different density or character, which will not intermix or combine with the first. I thus can obtain two liquids of different colors, which, by their movements in the instrument relative to one another, produce new and pleasing effects.

I therefore claim—

As a new manufacture for the kaleidoscope object-box, an object consisting of a hollow glass hermetically-sealed vessel and two liquids of different densities and colors placed in such vessel, such liquids being such as will not readily intermix or combine while in use in some respects.

C. G. BUSH.

Witnesses:
R. H. EDDY,
J. R. SNOW.